United States Patent

Iino et al.

[11] Patent Number: 5,418,651
[45] Date of Patent: May 23, 1995

[54] VEHICLE DISPLAY SYSTEM INCLUDING LIGHT REGULATING MEMBER

[75] Inventors: Tadashi Iino; Kunimitsu Aoki; Yoshiyuki Furuya, all of Shizuoka, Japan

[73] Assignee: Yazaki Corporation, Tokyo, Japan

[21] Appl. No.: 105,612

[22] Filed: Aug. 13, 1993

[30] Foreign Application Priority Data

Aug. 21, 1992 [JP] Japan ................................ 4-058838 U

[51] Int. Cl.⁶ ........................ G02B 23/08; G02B 5/08; B60R 1/04
[52] U.S. Cl. ........................................ 359/857; 353/11
[58] Field of Search ................ 353/11, 12, 13, 14; 359/841-843, 857, 859, 860, 893, 895, 884, 871, 855

[56] References Cited

U.S. PATENT DOCUMENTS

| | | | |
|---|---|---|---|
| 3,792,198 | 2/1974 | Hanson et al. | 359/855 |
| 4,504,910 | 3/1985 | Araki et al. | 353/12 |
| 4,635,033 | 1/1987 | Inukai et al. | 353/14 |
| 4,986,631 | 1/1991 | Aoki et al. | 350/112 |
| 4,999,011 | 3/1991 | Suzuki et al. | 353/13 |
| 5,028,912 | 7/1991 | Iino | 353/14 |
| 5,034,732 | 7/1991 | Iino | 353/14 |

FOREIGN PATENT DOCUMENTS

| | | |
|---|---|---|
| 0066496 | 5/1982 | European Pat. Off. . |
| 0104114 | 3/1983 | European Pat. Off. . |
| 0489953 | 12/1990 | European Pat. Off. . |
| 0415275 | 3/1991 | European Pat. Off. . |
| 0420196 | 4/1991 | European Pat. Off. . |
| 0492595 | 7/1992 | European Pat. Off. . |
| 3822222 | 1/1990 | Germany . |
| 1303231 | 1/1973 | United Kingdom . |
| 2240855 | 8/1991 | United Kingdom . |
| 9000262 | 1/1990 | WIPO . |
| 9013052 | 11/1990 | WIPO . |

*Primary Examiner*—Akm E. Ullah
*Attorney, Agent, or Firm*—Sughrue, Mion, Zinn, Macpeak & Seas

[57] ABSTRACT

An object of this invention is to provide a vehicle's display system in which the display surface of a display unit set deep in an opening structure of the instrument panel is prevented from being directly seen obliquely of the display window from side. In a vehicle's display system, a light control film (LCF) 7 is bonded to a half mirror 12 to cover its predetermined portion which spreads upwardly from the line thereof which is closest to the display surface of a display unit, to regulate light transmitting through the film obliquely from side.

5 Claims, 3 Drawing Sheets

VEHICLE DISPLAY SYSTEM INCLUDING LIGHT REGULATING MEMBER

BACKGROUND OF THE INVENTION

This invention relates to a vehicle's display system of head-up display type in which a mirror (or a concave mirror) and a half mirror are arranged to allow the operator of the vehicle to see the image of the display surface of a display unit as a virtual image thereof.

In an example of a vehicle's display system for displaying the speed of a vehicle, the revolutions per minute of an engine, and so forth, a display unit comprising various instruments is mounted on the instrument panel of a vehicle, and the operator is allowed to directly see the image of the display unit. In another example, in order to allow the operator to read the display image more quickly, light from the display unit is reflected by a mirror or mirrors to the point of sight of the operator, so that he may see the image of the display unit as a virtual image far away from him.

SUMMARY OF THE INVENTION

An object of this invention is to provide a vehicle's display system in which the display surface of a display unit set deep in an opening structure of the instrument panel cannot be seen obliquely of the display window of the instrument panel from side.

The foregoing object of the invention has been achieved by the provision of a vehicle's display system comprising: a display unit set deep in an opening structure of an instrument panel in such a manner that the display surface of the display unit is faced upwardly; a mirror set above the display unit in such a manner as to confront with the display surface of the display unit; and a half mirror provided between the mirror and the display unit in such a manner that the half mirror is sloped downward toward an operator' seat, in which light from the display surface of the display unit passes through the half mirror, reflected by the mirror, and reflected by the half mirror, so that the virtual image of the display unit is seen behind the half mirror, in which, according to the invention, a light regulating member is bonded to the surface of the half mirror to cover a predetermined portion thereof which spreads upwardly from the line thereon which is closest to the display surface of the display unit, to regulate light transmitting through the member obliquely from side.

In the vehicle's display system, a light control film may be utilized as the light regulating member.

In the vehicle's display system thus organized, the light control film (hereinafter referred to merely as "an LCF", when applicable) is bonded to the half mirror. Because of the function of the LCF, even when the display window is seen obliquely from the side, the display surface of the display unit set deep in an opening structure of the instrument panel cannot be directly seen. Thus, the virtual image of the display unit, which is to be seen, is high in visibility.

DETAILED DESCRIPTION OF THE PREFERRED EMBODIMENT(S)

Figure 5:
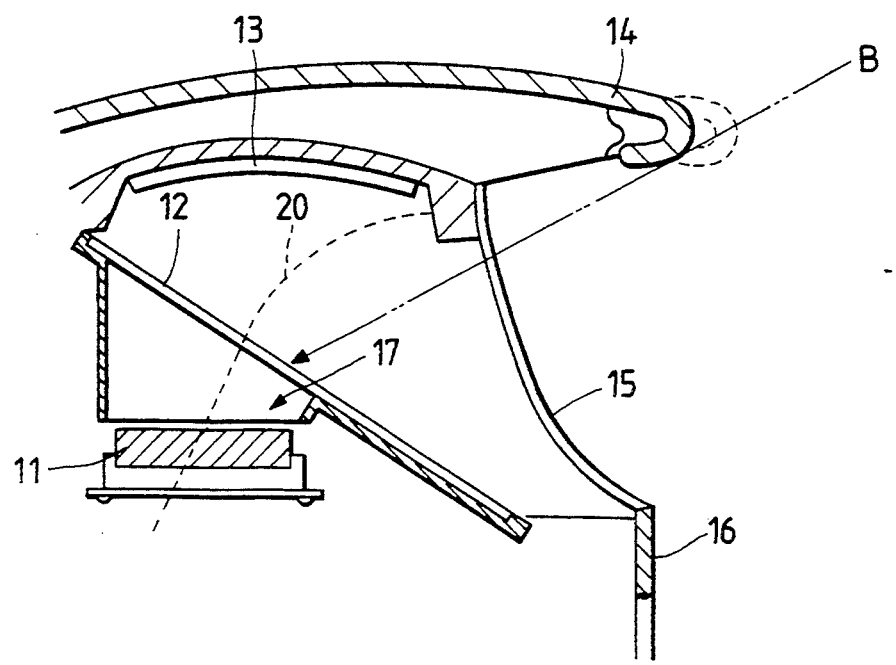
FIG. 5 is a sectional view showing one example of a vehicle's display unit.

One example of a vehicle's display system of the type, in which the light from the display unit is reflected by a mirror or mirrors to the point of sight of the operator, is as shown in FIG. 5. A display unit 11 for displaying vehicle data is set deep in an opening structure 17 of the instrument panel 16 with its display surface faced upwardly. A mirror 13 serving as a concave mirror is set above the display unit 11 in such a manner that it confronts with the display surface of the display unit 11. A half mirror 12 is provided between the display unit 11 and the mirror 13 in such a manner that it is sloped downward toward the operator's seat. Hence, light from the display surface of the display unit 11 passes through the half mirror 12 and is then reflected by the mirror 13. The light thus reflected is reflected by the half mirror to reach the point of sight of the operator, so that he sees the image of the display surface of the display unit as a virtual image behind the half mirror 12.

When the point of sight of the operator is above the instrument panel 16 as indicated at B in FIG. 5, then the operator may see the display surface of the display unit 11 directly through the half-mirror 12. That is, the virtual image of the display unit is low in visibility. In order to overcome this difficulty, the following means is provided: That is, the upper meter hood 14 is extended towards the operator's seat as indicated by the broken line in FIG. 5, so that, even when the point of sight of the operator is above the instrument panel 16 as indicated at B in FIG. 5, he may not see the display surface of the display unit 11.

In general, the meter hood 14 has its sides 20 formed as indicated by the broken line in FIG. 5. Therefore, when the point of sight of the operator is located obliquely above a display window 15; i.e., when it is located at the position C in FIG. 6, then the operator may see the display surface of the display unit directly. That is, the virtual image of the display unit is still low in visibility. This difficulty may be eliminated by having the sides 20 extended towards the operator's seat similarly as in the case of the meter hood 14. However, this method is disadvantageous in that the sides 20 thus extended are obstacles themselves in the limited space at the operator's seat, and poor in appearance.

Figure 6:
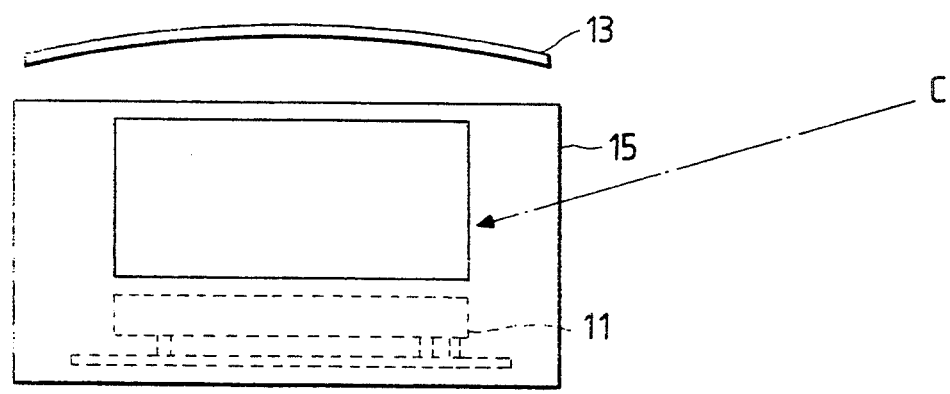
FIG. 6 is a front view of a display window in the one example of the vehicle's display unit.

The present invention is made to further improve the one example of the vehicle's display system shown in FIGS. 5 and 6, in such a manner that the display surface of a display unit set deep in an opening structure of the instrument panel cannot be seen obliquely of the display window of the instrument panel from side.

One preferred embodiment of this invention will be described with reference to FIGS. 1 through 4, in which parts corresponding functionally to those which have been described with reference to FIGS. 5 and 6 are therefore designated by the same reference numerals or characters.

Figure 1:
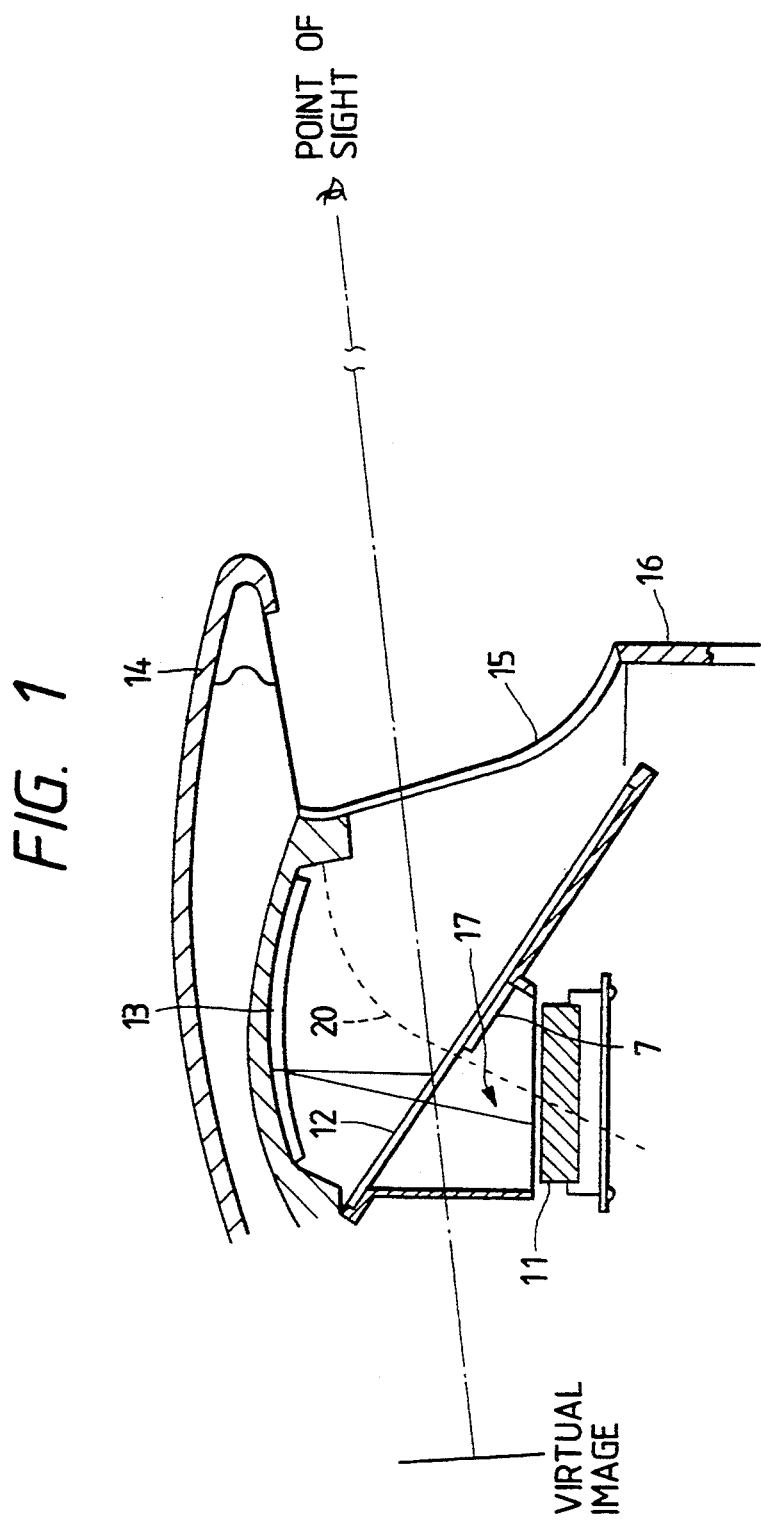
FIG. 1 is a sectional view showing a vehicle's display system, which constitutes one embodiment of this invention.

FIG. 1 shows an example of a vehicle's display system according to the invention. A display unit 11 for displaying vehicle data is set deep in an opening structure 17 of an instrument panel 16 with its display surface faced upwardly, and a mirror 13 serving as a concave mirror is disposed above the display unit 11 in such a manner that it confronts with the display surface of the display unit 11. The focal length of the mirror 13 is longer than the distance between the display unit 11 and the mirror 13.

A half mirror 12 is set between the mirror 13 and the display unit 11 in such a manner that it is sloped downward toward the operator's seat. Hence, light from the display surface of the display unit 11 passes through the half mirror 12 and is then reflected by the mirror 13. The light thus reflected is reflected by the half mirror 12 to reach the point of sight of the operator, so that the operator may see the image of the display surface of the display unit as a virtual image behind the half mirror 12.

Figure 2:
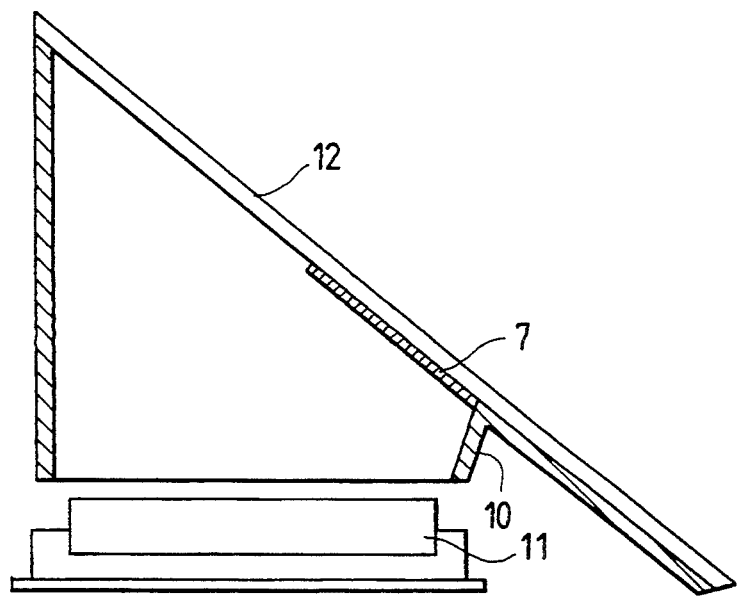
FIG. 2 is an enlarged sectional view showing a part of the display system shown in FIG. 1.
Figure 4:
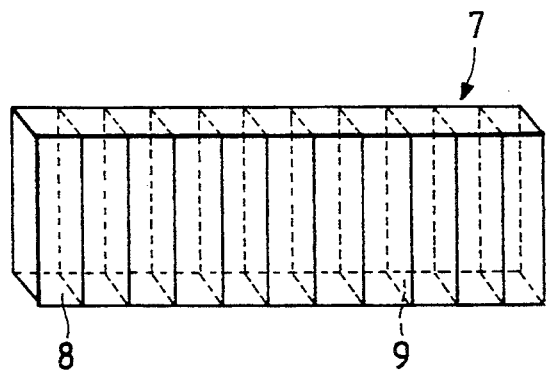
FIG. 4 is an enlarged perspective view of an LCF employed in the embodiment.

The vehicle's display system of the invention is different from the one example shown in FIGS. 5 and 6 in that, as shown in FIG. 2, a light control film LCF 7 having a width equal to the width of the half mirror 12 and a predetermined length is bonded to the lower surface (on the side of the display unit) of the half mirror 12 to cover a predetermined portion which spreads upward from the line thereon which is closest to the display unit 11. The LCF 7 is formed as follows: As shown in FIG. 4, a number of louvers of blackened silicon rubber are arranged vertically in parallel with one another in a transparent silicon rubber sheet 8 having a thickness of approximately 1 mm. When light is applied to the LCF, the latter functions as follows: That is, in the case when the incident angle of the light with respect to the surface of the LCF changes vertically, the light can pass through the LCF; whereas when it changes horizontally, the light becomes progressively difficult to pass through the LCF, and when the horizontal incident angle reaches a certain value, the light cannot pass through the LCF any longer. This critical incident angle depends on the thickness of the sheet 8 and the distance between the louvers 9.

Figure 3:
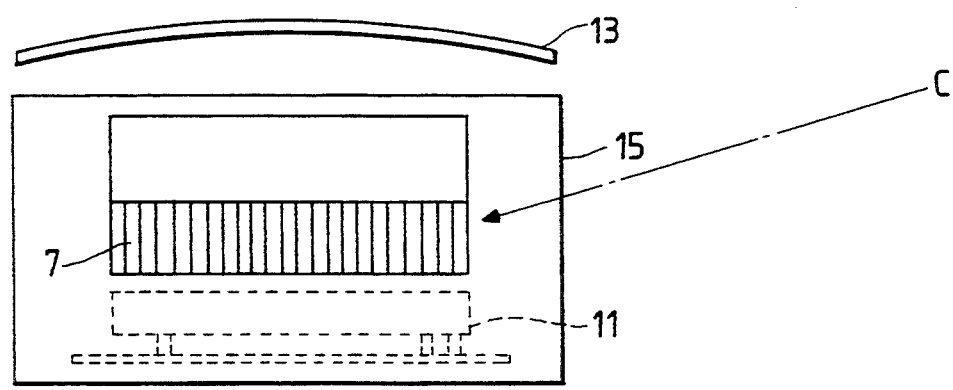
FIG. 3 is a front view of a display window in the embodiment of the invention.

FIG. 3 shows the LCF 7 bonded to the surface of the half mirror 12 as viewed through the display window 15. Light from the display unit 11, being blocked by the LCF 7, does not go in the direction C. That is, with the point of sight at the position C, the operator cannot see the display unit 11 directly. This means that the virtual image of the display unit is improved in visibility. In the conventional display system, in order to prevent the display unit 11 from being seen directly from front, the opening structure 17 has a wall 10. Therefore, in the conventional display unit, as the point of sight is lowered, observation of the display is abruptly discontinued. On the other hand, in the display system of the invention, the LCF 7 has a transmittance of 60% to 80%, and therefore the display light is decreased in intensity, which eliminates the above-described difficulty.

In the embodiment, the LCF is employed as a light regulating member; however, the invention is not limited thereto or thereby. That is, other louvers may be employed which operate in the same way as the LCF.

As was described above, in the vehicle's display system of the invention, the light regulating member whose width is large enough to regulate the oblique transmission of light is bonded to the surface of the half mirror upwards to cover the predetermined portion which spreads upwardly from the line thereof which is closest to the display surface of the display unit. Therefore, even when the operator sees the display window obliquely from side, he cannot directly see the display surface of the display unit. That is, the virtual image of the display unit is high in visibility.

The light regulating member is the LCF, which can be readily bonded to the conventional half mirror.

In the case when the display window is seen from below, the virtual image may be seen with its lower portion omitted. At this position, the LCF is provided. Therefore, in such a case, in the vehicle's display system of the invention, the display light being decreased in intensity, the virtual image can be more readily seen than in the conventional system.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A vehicle's display system comprising:
    a display unit recessed in an instrument panel and including an upwardly facing display surface;
    a mirror located above said display unit and in confronting relation to the display surface;
    a half mirror located between said mirror and said display unit and oriented in an inclined position such that light emitted from the display surface of said display unit passes through said half mirror, and is successively reflected by said mirror and said half mirror, so that the virtual image of said display unit is seen behind said half mirror; and
    a light regulating member bonded to at least a portion of a surface of said half mirror to regulate light transmitting through said member obliquely from a side; wherein said light control film is formed in such a manner that a number of louvers of blackened silicon rubber are arranged vertically in parallel with one another in a transparent silicon rubber sheet.

2. A system as claimed in claim 1, wherein said light regulating member comprises a light control film.

3. A system as claimed in claim 1, wherein said light regulating member has a width equal to the width of said half mirror.

4. A system as claimed in claim 2, wherein said light regulating member has a width equal to the width of said half mirror.

5. A system as claimed in claim 1, wherein said transparent silicon rubber sheet has a thickness of approximately 1 mm.

* * * * *